United States Patent
Maucec et al.

(10) Patent No.: US 10,359,541 B2
(45) Date of Patent: Jul. 23, 2019

(54) CREATING VIRTUAL PRODUCTION LOGGING TOOL PROFILES FOR IMPROVED HISTORY MATCHING

(71) Applicant: Landmark Graphics Corporation, Houston, TX (US)

(72) Inventors: Marko Maucec, Englewood, CO (US); Gustavo Adolfo Carvajal, Houston, TX (US); Ajay Pratap Singh, Houston, TX (US); Seyed M. Mirzadeh, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 422 days.

(21) Appl. No.: 14/911,257

(22) PCT Filed: Sep. 27, 2013

(86) PCT No.: PCT/US2013/062166
§ 371 (c)(1),
(2) Date: Feb. 9, 2016

(87) PCT Pub. No.: WO2015/034539
PCT Pub. Date: Mar. 12, 2015

(65) Prior Publication Data
US 2016/0187533 A1    Jun. 30, 2016

Related U.S. Application Data

(60) Provisional application No. 61/875,591, filed on Sep. 9, 2013.

(51) Int. Cl.
*G01V 1/50*    (2006.01)
*G01V 11/00*   (2006.01)
*G01V 99/00*   (2009.01)

(52) U.S. Cl.
CPC .............. *G01V 99/005* (2013.01); *G01V 1/50* (2013.01); *G01V 11/00* (2013.01)

(58) Field of Classification Search
CPC ......... G01V 99/005; G01V 11/00; G01V 1/50
USPC ......................................................... 703/10
See application file for complete search history.

(56) References Cited

U.S. PATENT DOCUMENTS

| | | | |
|---|---|---|---|
| 8,965,744 B2 * | 2/2015 | Da Veiga | G01V 11/00 703/10 |
| 2009/0198447 A1 | 8/2009 | Legendre et al. | |
| 2009/0314490 A1 * | 12/2009 | Prange | E21B 47/00 166/250.09 |
| 2010/0023269 A1 | 1/2010 | Yusti et al. | |
| 2011/0087473 A1 | 4/2011 | Jimenez Chavez et al. | |
| 2011/0119037 A1 | 5/2011 | Rashid et al. | |
| 2011/0125469 A1 | 5/2011 | Da Veiga et al. | |

FOREIGN PATENT DOCUMENTS

CN        1244768 C        3/2006

OTHER PUBLICATIONS

Office Action; Canadian Application No. 2,920,603; dated Jan. 11, 2017.
English abstract of CN1244768; retrieved from www.espacenet.com on Dec. 10, 2018.

* cited by examiner

*Primary Examiner* — Saif A Alhija
(74) *Attorney, Agent, or Firm* — Polsinelli PC

(57) ABSTRACT

Systems and methods for creating virtual production logging tool profiles for improved history matching and proactive control of smart wells.

21 Claims, 3 Drawing Sheets

CREATING VIRTUAL PRODUCTION LOGGING TOOL PROFILES FOR IMPROVED HISTORY MATCHING

CROSS-REFERENCE TO RELATED APPLICATIONS

This Application claims priority from PCT patent application Ser. No. PCT/US13/62166, filed on Sep 27, 2013, which claims priority from U.S. Provisional Patent Application Ser. No. 61/175,591 filed on Sep. 9, 2013, which are incorporated herein by reference.

STATEMENT REGARDING FEDERALLY SPONSORED RESEARCH

Not applicable.

FIELD OF THE DISCLOSURE

The present disclosure generally relates to systems and methods for creating virtual production logging tool profiles for improved history matching. More particularly, the present disclosure relates to creating virtual production logging tool profiles for improved history matching and proactive control of smart wells.

BACKGROUND

Conventional methods for estimating a liquid rate profile (Qliq) in the process of intelligent well completion using inflow control devices (ICDs) or inflow control valves (ICVs) require multiple steps of consecutive history matching. In one example of such a method, production and injection data per ICD segment (e.g. well production/injection rates, water saturation ($S_w$)) and the surface data at the well-head (e.g. pressure (p), temperature (T), liquid rate profile (Qliq) and the water cut) are used as inputs. The ICD segment corresponds to the length of well completion, controlled by a given ICD. The surface data is used to update a well model, which is then run to calculate an updated operating point ($p_u$, $T_u$). Local history matching is performed using standard misfit minimization techniques well known in the art and a new operating point ($p_n$, $T_n$) is determined, which corresponds to the minimized misfit between the surface data and the well model data. The new operating point ($p_n$, $T_n$) is used to initialize and run a hydraulic model, which calculates production and pressure logging profiles. History matching of production logging tool (PLT) data is performed using the standard misfit minimization techniques well known in the art to calculate a new production and pressure logging profile. The new production and pressure logging profile is used by a reservoir model to history match water-cut profiles and gas oil ratios using the standard misfit minimization techniques well known in the art.

In the forgoing example, the process is time-consuming because it requires three consecutive steps of standard history matching. Moreover, the process delivers sub-optimal results in terms of the liquid rate profile (Qliq) per ICD segment because it does not account for the uncertainty in the distribution of reservoir parameters (e.g. grid-cell permeability) in close proximity to the well. And, the process delivers sub-optimal results in terms of the liquid rate profile (Qliq) per ICD segment because it does not account for the optimal resolution of reservoir parameters (e.g. grid-cell permeability) in the reservoir model.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

Figure 1:
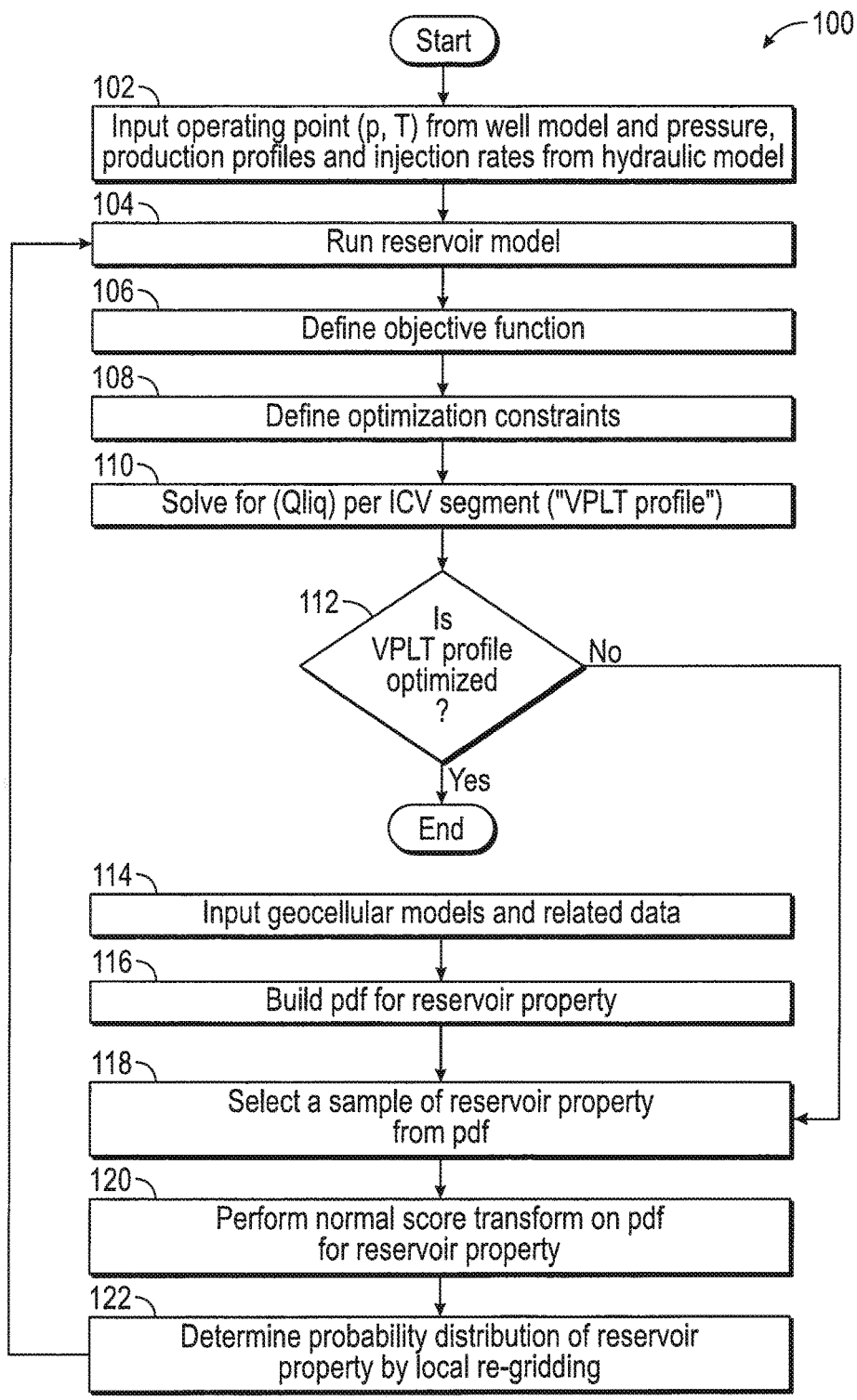
FIG. 1 is a flow diagram illustrating one embodiment of a method for implementing the present disclosure.

The present disclosure therefore, overcomes one or more deficiencies in the prior art by providing systems and methods for creating virtual production logging tool profiles for improved history matching and proactive control of smart wells.

In one embodiment, the present disclosure includes a method for creating a virtual production logging tool profile, comprising: a) building a probability density function (pdf) for a reservoir property associated with one or more geocellular models and related data using a computer system; b) selecting a sample of the reservoir property from the pdf; c) performing a normal score transform on the pdf for the reservoir property using the selected sample; d) determining a probability distribution of the reservoir property by local re-gridding using the normal score transform performed on the pdf for the reservoir property; e) running a reservoir model using the probability distribution to generate a water cut and a liquid rate profile (Qliq); f) defining an objective function using the water cut and (Qliq); g) defining one or more optimization constraints; and h) solving (Qliq) for each inflow control device segment, which represents the virtual production logging tool profile, using the objective function and the one or more optimization constraints, In another embodiment, the present disclosure includes a non-transitory program carrier device tangibly carrying computer executable instructions for creating a virtual production logging tool profile, the instructions being executable to implement: a) building a probability density function (pdf) for a reservoir property associated with one or more geocellular models and related data; b) selecting a sample of the reservoir property from the pdf; c) performing a normal score transform on the pdf for the reservoir property using the selected sample; d) determining a probability distribution of the reservoir property by local re-gridding using the normal score transform performed on the pdf for the reservoir property; e) running a reservoir model using the probability distribution to generate a water cut and a liquid rate profile (Qliq); f) defining an objective function using the water cut and (Qliq); g) defining one or more optimization constraints; and h) solving (Qliq) for each inflow control device segment, which represents the virtual production logging tool profile, using the objective function and the one or more optimization constraints.

In yet another embodiment, the present invention includes a non-transitory program carrier device tangibly carrying computer executable instructions for creating a virtual production logging tool profile, the instructions being executable to implement: a) building a probability density function (pdf) for a reservoir property associated with one or more geocellular models; b) selecting a sample of the reservoir property from the pdf; c) performing a normal score transform on the pdf for the reservoir property using the selected sample; d) determining a probability distribution of the reservoir property by local re-gridding using the normal score transform performed on the pdf for the reservoir property; e) running a reservoir model using the probability distribution to generate a water cut and a liquid rate profile (Qliq); f) solving (Qliq) for each inflow control device segment, which represents the virtual production logging tool profile, using an objective function based on the water cut and (Qliq) and one or more optimization constraints; and g) repeating steps b)-f) until the virtual production logging tool profile is optimized.

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present disclosure are not limited thereto and may also be applied in other industries to achieve similar results.

Method Description

Referring now to FIG. 1, a flow diagram of one embodiment of a method 100 for implementing the present disclosure is illustrated.

In step 102, an operating point representing a pressure (p) and a temperature (T) as a result of running a well model using techniques well known in the art and pressure (e.g. bottom hole pressure), production (e.g. gas oil ratio) profiles and injection rates as a result of running a hydraulic model using techniques well known in the art are input for a reservoir model.

In step 104, the reservoir model is run using the operating point (p, T), the pressure, production profiles and techniques well known in the art to generate a water cut, a liquid rate profile (Qliq) and a saturation profile (Sw).

In step 106, an objective function is defined using the water cut, the liquid rate profile (Qliq) and techniques well known in the art. The objective function is defined as the misfit between the modeled and measured parameters, here the water cut (wc)=f(k, Qliq), where f represents the non-linear relationship. Thus optimization is preferred. The control variables correspond to dynamic data (total Qliq) and static data (e.g. reservoir parameter like permeability (k). The objective is to reconcile the reservoir model with dynamic data to minimize the well water cut at the same time.

Control variables with associated statistical modes, mean ($\mu$) and standard deviation ($\sigma$) may be represented as:

Permeability k ($\mu_k$, $\sigma_k$)
Qliq ($\mu_Q$, $\sigma_Q$)

The defined objective function may therefore, be represented as:

$$OF = \sum_{m=1}^{M} \left[ \frac{w_{1m}}{s_{1m}} (\mu_{ym} - T_m)^2 + \frac{w_{2m}}{s_{2m}} \sigma_{ym}^2 \right] \quad (1)$$

$$= \left[ \left( \frac{w_{1k}}{s_{1k}} (\mu_k - T_k)^2 + \frac{w_{2k}}{s_{2k}} \sigma_k^2 \right) + \left( \frac{w_{1Q}}{s_{1Q}} (\mu_Q - T_Q)^2 + \frac{w_{2Q}}{s_{2Q}} \sigma_Q^2 \right) \right]$$

where ($\mu$) corresponds to measured mean and (T) corresponds to modeled (target) mean. The weights ($w_1$) and ($w_2$) and scaling factors ($s_1$) and ($s_2$) correspond to the "mean on target" and "minimize variation" objective components. In the first approximation of the application ($s_{1k}=s_{2k}=s_{1Q}=s_{1Q}=1$ (normalized to unity) and $w_{1k}=w_{2k}=w_{1Q}=w_{1Q}=f(d)$), where (d) corresponds to the grid-cell divider from the local re-gridding in step 122. It is important to note that, when operating in normal score transform domain, $\mu_k=0$ and $\sigma_k=1$.

In step 108, one or more optimization constraints are defined using the injection rates, the operating point (p,T) and techniques well known in the art. The variation constraints may be represented as: $p+n\sigma_p \leq p_i \leq p-n\sigma_p$ and $T+n\sigma_T \leq T_i \leq T-n\sigma_T$ where ($p_i$) and ($T_i$) correspond to the i-th sample of measured pressure or temperature. The mean constraints may be represented as: $g(\mu_p, \mu_T) \geq 0$.

Figure 3A:
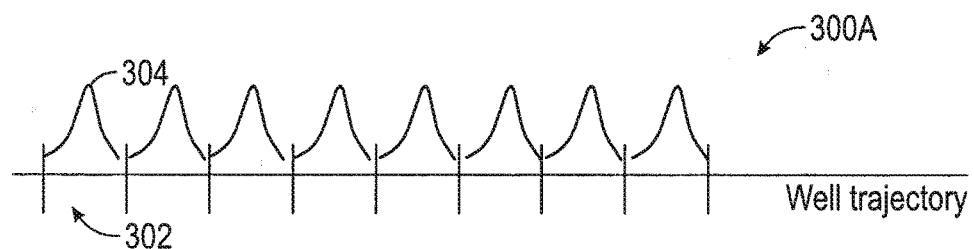
FIG. 3A is a display illustrating a probability density function for permeability as a reservoir property along the trajectory of a horizontal well as a result of step 206 in FIG. 2.
Figure 3B:
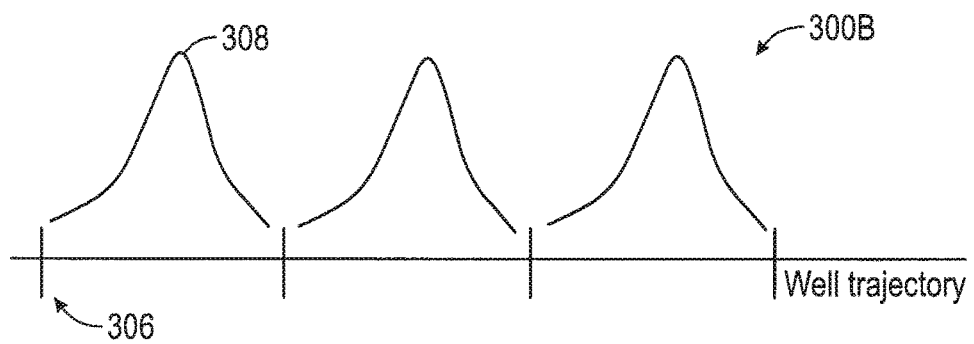
FIG. 3B is a display illustrating the distribution of a permeability probability density function along the trajectory of the horizontal well in FIG. 3A as a result of one or more iterations of step 110 in FIG. 1.

In step 110, the liquid rate profile (Qliq) per ICD segment is solved using the objective function and optimization constraints in well known stochastic optimization techniques. Examples of well known stochastic optimization techniques include Markov chain Monte Carlo or Adaptive Simulated Annealing, where the objective function can be defined in the Gaussian form, The result represents a virtual production logging tool profile hereinafter referred to as a VPLT profile. The VPLT profile guarantees the minimized misfit in global water cut distribution per well, which may be represented as: $Qliq_{|optimized\ per\ ICD} = Qliq_{|we\_misfit=min}$. In FIG. 3B, for example, a display 300B of the distribution of a permeability probability density function along the trajectory of the horizontal well in FIG. 3A is illustrated as a result of one or more iterations of this step. The distributions 308 correspond to the distribution of the reservoir property following steps 114-122, which is constrained by the portion of the well trajectory controlled by the individual ICD. Each distribution 308 thus, is built by accumulating the reservoir property values within each respective ICD segment 306 along the well trajectory. Each ICD segment 306 in FIG. 3B separates a distribution 308 and combines the grid cells 302 in FIG. 3A into a larger pseudo-cell that is represented by an ICD segment 306. The number of grid cells 302 combined into the larger pseudo-cell is determined by the grid cell dividers described in reference to step 122.

In step 112, the method 100 determines if the VPLT profile is optimized by comparing the last VPLT profile from step 110 with a predetermined VPLT profile representing a minimum water cut and gas oil ratio. If the last VPLT profile from step 110 is less than or equal to the predetermined VPLT profile, then the VPLT profile is optimized. If the VPLT profile is optimized, then the method 100 ends. If the VPLT is not optimized, then the method 100 proceeds to step 118.

In step 114, one or more geocellular models (n) and related data are input. The geocellular model represents a static geocellular model that combines a (i,j,k) geocellular grid populated with a reservoir property such as, for example, permeability (k). Each geocellular model therefore, includes one or more grid cells (c). The related data may include, for example, one or more well trajectories (t) as part of a dynamic/simulation model that delineates the (i,j,k) path of the well under consideration.

In step 116, a probability density function (pdf) is built or updated for a reservoir property associated with the data input in step 114. One embodiment of a method for performing this step is described further in reference to FIG. 2.

In step 118, a sample of the reservoir property is selected from the pdf built or updated in step 116, In step 120, a normal score transform is performed on the pdf for the reservoir property ($p_k^t(c)$) built or updated in step 116 using the sample selected in step 118 and techniques well known in the art. The values of the pdf ($p_k^t(c)$) are ranked in ascending order for all values i=(1, ... N). The cumulative frequency or $p_m$ quantile for the observation of rank (m) are then calculated using: $p_m = \Sigma_{t=1}^{m} w_i - 0.5 w_i$ where (w) is the weight of the sample selected in step 118 with rank (m). If the weight (w) of the sample is not available, then the default weight of ($w_m = 1/N$) is used. The normal score transform of the sample with rank (m) is the $p_m$ quantile of the standard normal distribution represented as: $\tilde{p}_{k,m}^t(c) = G^{-1}(p_k^t(c))$ where G(•) is the cumulative standard normal distribution. For simplicity, the normal score transform may be referred to without specifying the rank (m) (i.e. $\tilde{p}_k^t(c)$).

In step 122, a probability distribution of the reservoir property is determined by local re-gridding using the normal score transform ($\tilde{p}_k^t(c)$) from step 120. Local re-gridding is performed in the grid-model regions where the updated density of grid-blocks is warranted in order to render the resolution of the reservoir property that conforms with ICD grid segmentation and renders higher accuracy of the related estimators and improved sampling statistics. Grid-block resolution is altered accordingly in the vicinity of the wells equipped with ICDs to model significant variations in pressure or fluid flow near the wellbore. A volume of interest is first selected that embodies all ICD sub-segments. The grid-cell dividers (d) (for each I,J,K grid-cell location or subset of grid-cells) are defined. The size of the subset corresponds to the size of ICD segment. For each normal score transform value ($\tilde{p}_k^t(c)$) associated with an I, J, K grid-cell location, a grid-cell divider for the corresponding location is applied. This generates localized multiplication of grid-cells with associated normal score transform ($\tilde{p}_k^t(c)$) values. The local re-gridding guarantees an unbiased estimator in the Gaussian domain. The result of local re-gridding is a new distribution, weighted by dividers associated with ICD segments. The normal score transform ($\tilde{p}_k^t(c)$) thus, becomes ($\tilde{p}_{k,d}^t(c)$) which is used as another input to run the reservoir model in step 104. The next iteration of step 104 will run the reservoir model to generate another water cut, liquid rate profile (Qliq) and saturation profile ($S_w$) that minimizes the misfit in the water cut.

The method 100 creates VPLT profiles for proactive control of smart wells. Each VPLT profile represents an optimized liquid rate profile (Qliq) that matches the well completion profile also referred to as the inflow control valve ICD segment. The method 100 therefore, optimizes the down hole valve setting, in real time, to maximize the oil recovery factor by reducing water cut and/or gas oil ratios. By calculating the water flow rates per ICD segment, any type of water flooding optimization can be facilitated.

Figure 2:
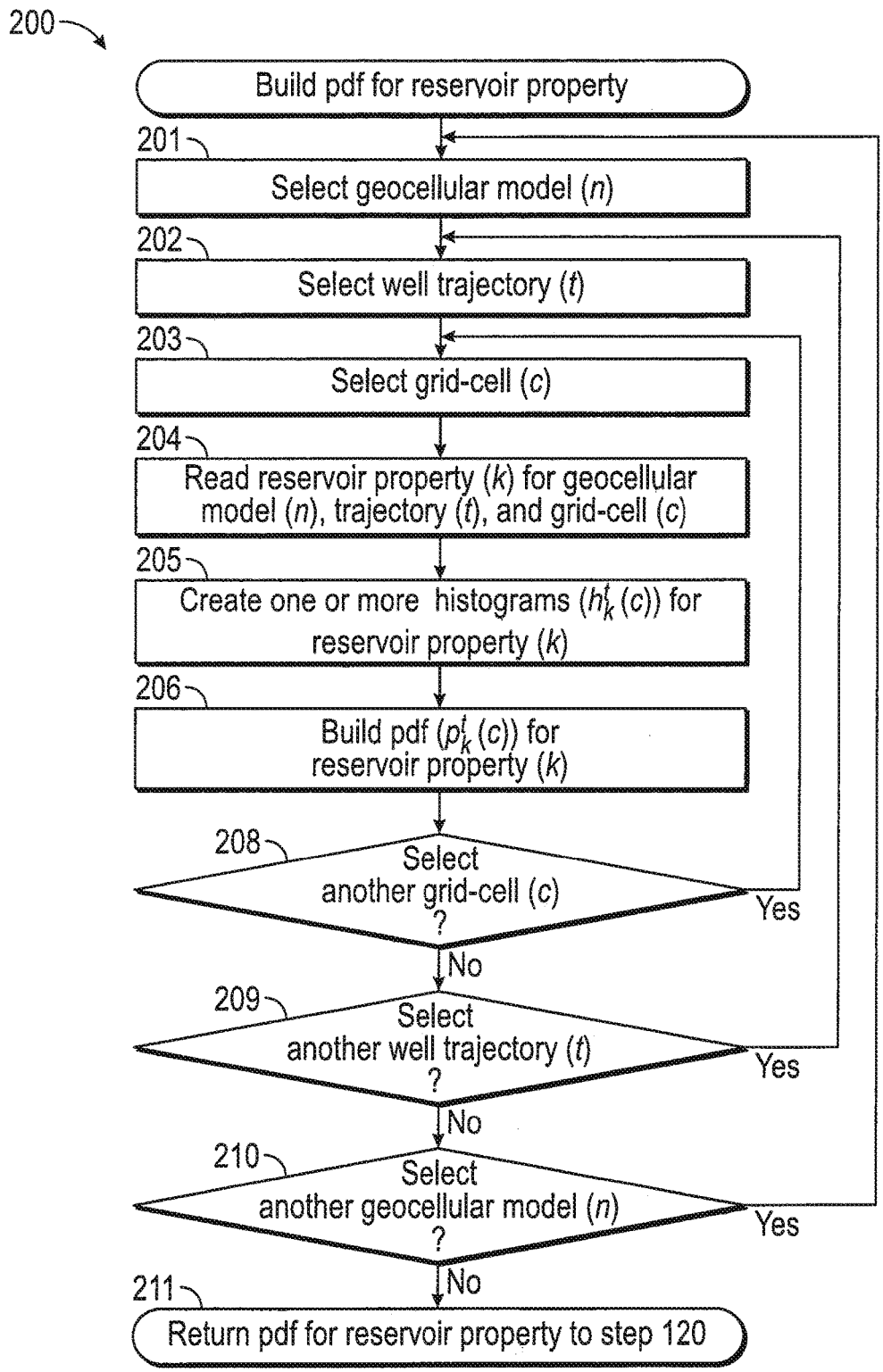
FIG. 2 is a flow diagram us illustrating one embodiment of a method for performing step 104 in FIG. 1.

Referring now to FIG. 2, a flow diagram of one embodiment of a method 200 for performing step 116 in FIG. 1 is illustrated.

Figure 4:
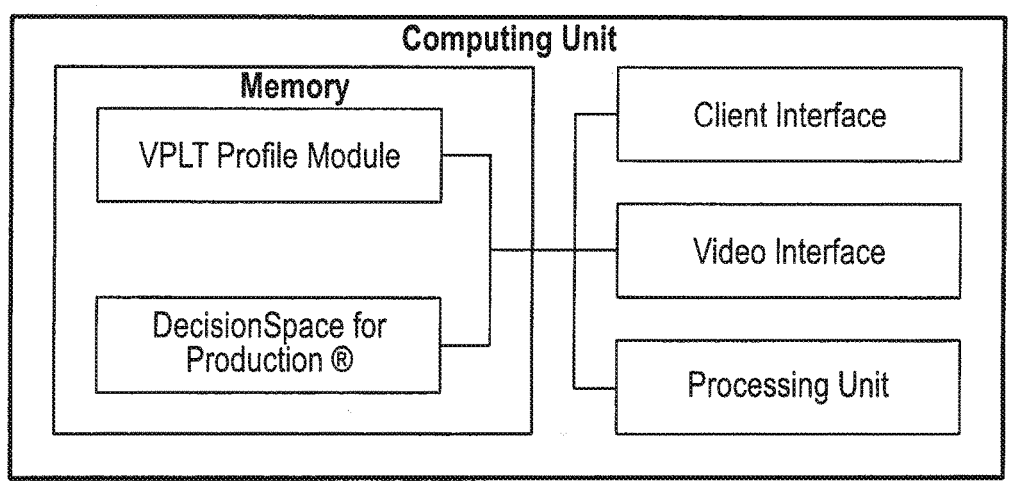
FIG. 4 is block diagram illustrating one embodiment of a computer system for implementing the present disclosure.

In step 201, a geocellular model (n) is automatically selected from the total number of geocellular models input in step 114 or, alternatively, may be selected using the client interface and/or the video interface described further in reference to FIG. 4.

In step 202, a well trajectory (t) for the selected geocellular model is automatically selected from the total number of well trajectories input in step 114 or, alternatively, may be selected using the client interface and/or the video interface described further in reference to FIG. 4.

In step 203, a grid cell (c) for the selected reservoir model is automatically selected from the total number of grid cells input in step 114 or, alternatively, may be selected using the client interface and/or the video interface described further in reference to FIG. 4.

In step 204, a reservoir property (k) is identified for the selected geocellular model (n), well trajectory (t) and grid cell (c) using techniques well known in the art.

In step 205, one or more histograms ($h_k^t(c)$) are created for the reservoir property (k) using the data input in step 114 and techniques well known in the art.

In step 206, a probability density function (pdf) for reservoir property (k) is built ($p_k^t(c)$) or updated using the histograms ($h_k^t(c)$), the following equation: $p_k^t(c) = h_k^t(c)/_c$ and techniques well known in the art. In FIG. 3A, for example, a display of the probability density function for permeability as the reservoir property (k) is illustrated along the trajectory of a horizontal well as a result of this step. The distribution 304 is equivalent to the grid resolution of the geocellular model (n) selected in step 201. Thus, the size of each distribution 304 corresponds with a respective grid cell 302 from the geocellular model (n). Because each grid cell 302 in FIG. 3A is smaller than the pseudo-cell represented by an ICD segment 306 in FIG. 3B, the achieved statistics of each distribution 304 in FIG. 3A is less than that of each distribution 308 in FIG. 3B. The local re-gridding in step 122 of FIG. 1 that improves the distribution from distribution 304 to distribution 308 thus, reduces the associated uncertainty.

In step 208, the method 200 determines if there is another grid-cell (c) to select from the total number of remaining grid cells for the selected reservoir model. If there is another grid-cell (c) to select, then the method 200 returns to step 203. If there is not another grid-cell (c) to select, then the method 200 proceeds to step 209.

In step 209, the method 200 determines if there is another well trajectory (t) to select from the total number of remaining well trajectories for the selected reservoir model. If there is another well trajectory (t) to select, then the method 200 returns to step 202. If there is not another well trajectory (t) to select, then the method 200 proceeds to step 210.

In step 210, the method 200 determines if there is another reservoir model (n) to select from the total number of remaining reservoir models. If there is another reservoir model (n) to select, then the method 200 returns to step 201. If there is not another reservoir model (n) to select, then the method 200 returns the updated pdf for reservoir property (k) to step 120.

System Description

The present disclosure may be implemented through a computer executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. DecisionSpace® for Production, which is a commercial software application marketed by Landmark Graphics Corporation, may be used as interface applications to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 4, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer executable instructions, executed by the computing unit for implementing the present disclosure described herein and illustrated in FIGS. 1-3, The memory therefore, includes a VPLT profile module, which enables the methods described in reference to steps 106-122 in FIG. 1. The foregoing modules and applications may integrate functionality from the remaining application programs illustrated in FIG. 4. In particular, DecisionSpace® for Production may be used as an interface application to perform steps 102-404 in FIG. 1. Although DecisionSpace® for Production may be used as an interface application, other interface applications may be used, instead, or the VPLT profile module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB), A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for creating a virtual production logging tool profile, comprising:
   a) building a probability density function (pdf) for a reservoir property associated with one or more geocellular models and related data using a computer system;

b) selecting a sample of the reservoir property from the pdf;
c) performing a normal score transform on the pdf for the reservoir property using the selected sample;
d) determining a probability distribution of the reservoir property by local re-gridding using the normal score transform performed on the pdf for the reservoir property;
e) running a reservoir model using the probability distribution to generate a water cut and a liquid rate profile (Qliq);
f) defining an objective function using the water cut and (Qliq);
g) defining at least one optimization constraint comprising a minimized water cut;
h) solving (Qliq) for each inflow control device segment, which represents the virtual production logging tool profile, using the objective function and the at least one optimization constraint; and
i) adjusting one or more downhole inflow control valves (ICD) based on the solved (Qliq).

2. The method of claim 1, further comprising repeating steps b)-h) until the virtual production logging tool profile is optimized.

3. The method of claim 1, further comprising running the reservoir model using an operating point, a pressure profile and a production profile.

4. The method of claim 3, wherein the at least one optimization constraint is defined using one or more injection rates and the operating point.

5. The method of claim 2, wherein the virtual production logging tool is optimized when a last virtual production logging tool profile is less than or equal to a predetermined virtual production logging tool profile.

6. The method of claim 5, wherein the predetermined virtual production logging tool profile represents a minimum water cut and gas oil ratio.

7. The method of claim 1, wherein the pdf is built by:
a) reading the reservoir a property for one of the one or more geocellular models, one of one or more well trajectories and one of one or more grid cells;
b) creating one or more histograms for the reservoir property;
c) building the pdf for the reservoir property using the one or more histograms; and
d) repeating steps a)-c) for each of the one or more grid cells, each of the one or more well trajectories and each of the one or more geocellular models wherein each iteration updates the pdf built.

8. A non-transitory program carrier device tangibly carrying computer executable instructions for creating a virtual production logging tool profile, the instructions being executable to implement:
a) building a probability density function (pdf) for a reservoir property associated with one or more geocellular models and related data;
b) selecting a sample of the reservoir property from the pdf;
c) performing a normal score transform on the pdf for the reservoir property using the selected sample;
d) determining a probability distribution of the reservoir property by local re-gridding using the normal score transform performed on the pdf for the reservoir property;
e) running a reservoir model using the probability distribution to generate a water cut and a liquid rate profile (Qliq);
f) defining an objective function using the water cut and (Qliq);
g) defining at least one optimization constraint comprising a minimized water cut;
h) solving (Qliq) for each inflow control device segment, which represents the virtual production logging tool profile, using the objective function and the at least one optimization constraint; and
i) adjusting one or more downhole inflow control valves (ICD) based on the solved (Qliq).

9. The program carrier device of claim 8, further comprising repeating steps b)-h) until the virtual production logging tool profile is optimized.

10. The program carrier device of claim 8, further comprising running the reservoir model using an operating point, a pressure profile and a production profile.

11. The program carrier device of claim 10, wherein the at least one optimization constraint is defined using one or more injection rates and the operating point.

12. The program carrier device of claim 9, wherein the virtual production logging tool is optimized when a last virtual production logging tool profile is less than or equal to a predetermined virtual production logging tool profile.

13. The program carrier device of claim 12, wherein the predetermined virtual production logging tool profile represents a minimum water cut and gas oil ratio.

14. The program carrier device of claim 8, wherein the pdf is built by:
a) reading the reservoir a property for one of the one or more geocellular models, one of one or more well trajectories and one of one or more grid cells;
b) creating one or more histograms for the reservoir property;
c) building the pdf for the reservoir property using the one or more histograms; and
d) repeating steps a)-c) for each of the one or more grid cells, each of the one or more well trajectories and each of the one or more geocellular models wherein each iteration updates the pdf built.

15. A non-transitory program carrier device tangibly carrying computer executable instructions for creating a virtual production logging tool profile, the instructions being executable to implement:
a) building a probability density function (pdf) for a reservoir property associated with one or more geocellular models;
b) selecting a sample of the reservoir property from the pdf;
c) performing a normal score transform on the pdf for the reservoir property using the selected sample;
d) determining a probability distribution of the reservoir property by local re-gridding using the normal score transform performed on the pdf for the reservoir property;
e) running a reservoir model using the probability distribution to generate a water cut and a liquid rate profile (Qliq);
f) solving (Qliq) for each inflow control device segment, which represents the virtual production logging tool profile, using an objective function based on the water cut and (Qliq) and an optimization constraint comprising a minimized water cut;
g) repeating steps b)-f) until the virtual production logging tool profile is optimized; and
i) adjusting one or more downhole inflow control valves (ICD) based on the solved (Qliq) after the virtual production logging tool profile is optimized.

16. The program carrier device of claim 15, further comprising running the reservoir model using an operating point, a pressure profile and a production profile.

17. The program carrier device of claim 16, wherein the the at least one optimization constraint is defined using one or more injection rates and the operating point.

18. The program carrier device of claim 15, wherein the virtual production logging tool is optimized when a last virtual production logging tool profile is less than or equal to a predetermined virtual production logging tool profile.

19. The program carrier device of claim 18, wherein the predetermined virtual production logging tool profile represents a minimum water cut and gas oil ratio.

20. The program carrier device of claim 15, wherein the pdf is built by:
   a) reading the reservoir a property for one of the one or more geocellular models, one of one or more well trajectories and one of one or more grid cells;
   b) creating one or more histograms for the reservoir property;
   c) building the pdf for the reservoir property using the one or more histograms; and
   d) repeating steps a)-c) for each of the one or more grid cells, each of the one or more well trajectories and each of the one or more geocellular models wherein each iteration updates the pdf built.

21. The method of claim 1 wherein the at least one constraint further comprises a maximized hydrocarbon component.

* * * * *